United States Patent
Yu et al.

(10) Patent No.: US 12,401,461 B2
(45) Date of Patent: Aug. 26, 2025

(54) USER EQUIPMENT BEHAVIOR OF HYBRID AUTOMATIC REPEAT REQUEST RETRANSMISSION IN NEW RADIO SIDELINK CO-EXISTENCE SCENARIO WITH OTHER TECHNOLOGY

(71) Applicant: NOKIA TECHNOLOGIES OY, Espoo (FI)

(72) Inventors: Ling Yu, Kauniainen (FI); Nuno Manuel Kiilerich Pratas, Gistrup (DK); Daniel Medina, Munich (DE); Torsten Wildschek, Gloucester (GB); Vinh Van Phan, Oulu (FI); Faranaz Sabouri-Sichani, Aalborg (DK); Jari Olavi Lindholm, Palojoki (FI); Thomas Haaning Jacobsen, Nørresundby (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 477 days.

(21) Appl. No.: 17/957,383

(22) Filed: Sep. 30, 2022

(65) Prior Publication Data
US 2024/0113815 A1 Apr. 4, 2024

(51) Int. Cl.
*H04L 1/18* (2023.01)
*H04L 1/1812* (2023.01)
*H04L 1/1825* (2023.01)

(52) U.S. Cl.
CPC .......... *H04L 1/1825* (2013.01); *H04L 1/1812* (2013.01)

(58) Field of Classification Search
CPC ..... H04W 80/04; H04W 88/06; H04W 88/08; H04W 84/18; H04L 29/06; H04L 1/1825; H04L 1/1812

(Continued)

(56) References Cited

U.S. PATENT DOCUMENTS

2020/0022089 A1* 1/2020 Guo .................... H04W 52/242
2020/0029318 A1* 1/2020 Guo ...................... H04L 5/0055
(Continued)

FOREIGN PATENT DOCUMENTS

EP 3 817 262 A1 5/2021
EP 4 030 663 A1 7/2022
(Continued)

OTHER PUBLICATIONS

3GPP TSG RAN Meeting #94e, Electronic Meeting, Dec. 6-17, 2021, RP-213678 (revision of RP-213672), Source: OPPO, LG Electronics, Title: New WID on NR sidelink evolution, Agenda Item: 8.6.1. (Year: 2021).*

(Continued)

*Primary Examiner* — Peter G Solinsky
*Assistant Examiner* — Sanjay K Dewan
(74) *Attorney, Agent, or Firm* — SQUIRE PATTON BOGGS (US) LLP (57) ABSTRACT

Systems, methods, apparatuses, and computer program products for user equipment behavior with respect to hybrid automatic repeat request retransmission in new radio sidelink co-existence scenarios with another technology are provided. For example, a method can include enabling, for a receiving user equipment, hybrid automatic repeat request negative acknowledgement only feedback. The method can also include first determining whether to condition negative feedback on at least one first condition, or second determining whether negative feedback is conditioned on at least one second condition. The method can further include third determining whether to retransmit a message according to hybrid automatic repeat request according to results of the first determining or the second determining. The method can additionally include communicating with the receiving user equipment based on a result of the third determining.

19 Claims, 6 Drawing Sheets

(58) Field of Classification Search
USPC .......................................................... 370/328
See application file for complete search history.

(56) References Cited

U.S. PATENT DOCUMENTS

| 2020/0099476 | A1* | 3/2020 | Park | ................. | H04W 4/70 |
| 2020/0228247 | A1* | 7/2020 | Guo | ................. | H04L 1/0025 |
| 2020/0267597 | A1* | 8/2020 | Huang | ................. | H04L 1/1812 |

FOREIGN PATENT DOCUMENTS

| KR | 4 030 663 A1 * | 7/2022 | ............... | H04L 1/18 |
| TW | 3 817 262 A1 * | 5/2021 | ............... | H04L 1/18 |
| WO | WO 2022/021314 A1 * | 2/2022 | ............ | H04W 72/04 |

OTHER PUBLICATIONS

Extended European Search Report dated Feb. 27, 2024 corresponding to European Patent Application No. 23196944.5.

Oppo et al., "New WID on NR sidelink evolution," 3GPP Draft RP-213678, 3GPP TSG RAN Meeting #94e, Electronic Meeting, Dec. 6-17, 2021.

3GPP TS 38.212 V16.10.0 (Jun. 2022), Technical Specification, 3rd Generation Partnership Project; Technical Specification Group Radio Access Network; NR; Multiplexing and channel coding (Release 16), Jun. 2022.

3GPP TS 38.321 V17.1.0 (Jun. 2022), Technical Specification, 3rd Generation Partnership Project; Technical Specification Group Radio Access Network; NR; Medium Access Control (MAC) protocol specification (Release 17), Jun. 2022.

* cited by examiner

USER EQUIPMENT BEHAVIOR OF HYBRID AUTOMATIC REPEAT REQUEST RETRANSMISSION IN NEW RADIO SIDELINK CO-EXISTENCE SCENARIO WITH OTHER TECHNOLOGY

FIELD

Some example embodiments may generally relate to communications including mobile or wireless telecommunication systems, such as Long Term Evolution (LTE) or fifth generation (5G) radio access technology or new radio (NR) access technology, or other communications systems including subsequent generations of the same or similar standards. For example, certain example embodiments may generally relate to user equipment behavior with respect to hybrid automatic repeat request retransmission in new radio sidelink co-existence scenarios with another technology.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system is mostly built on a 5G new radio (NR), but a 5G (or NG) network can also build on the E-UTRA radio. From release 18 (Rel-18) onward, 5G is referred to as 5G advanced. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio. 6G is currently under development and may replace 5G and 5G advanced.

SUMMARY

An embodiment may be directed to an apparatus. The apparatus can include at least one processor and at least memory including computer program. The at least one memory and the computer program can be configured to, with the at least one processor, cause the apparatus at least to perform enabling, for a receiving user equipment, hybrid automatic repeat request feedback for a message transmission to the receiving user equipment. The at least one memory and the computer program can also be configured to, with the at least one processor, cause the apparatus at least to perform first determining whether hybrid automatic repeat request feedback is conditioned on at least one first condition. The at least one memory and the computer program can further be configured to, with the at least one processor, cause the apparatus at least to perform second determining whether to retransmit the message according to hybrid automatic repeat request according to a result of the first determining. The at least one memory and the computer program can additionally be configured to, with the at least one processor, cause the apparatus at least to perform communicating with the receiving user equipment based on a result of the second determining.

An embodiment may be directed to an apparatus. The apparatus can include at least one processor and at least memory including computer program. The at least one memory and the computer program can be configured to, with the at least one processor, cause the apparatus at least to perform activating, at a receiving user equipment, hybrid automatic repeat request feedback for a message received from a transmitting user equipment. The at least one memory and the computer program can also be configured to, with the at least one processor, cause the apparatus at least to perform determining whether to provide hybrid automatic repeat request feedback regarding the message conditioned on at least one condition in addition to whether the message was successfully decoded. The at least one memory and the computer program can further be configured to, with the at least one processor, cause the apparatus at least to perform providing or suppressing hybrid automatic repeat request feedback to the transmitting user equipment based on a result of the determining.

An embodiment may be directed to a method. The method can include enabling, for a receiving user equipment, hybrid automatic repeat request feedback for a message transmission to the receiving user equipment. The method can also include first determining, by a transmitting user equipment, whether hybrid automatic repeat request feedback is conditioned on at least one first condition. The method can further include second determining whether to retransmit the message according to hybrid automatic repeat request according to a result of the first determining. The method can additionally include communicating with the receiving user equipment based on a result of the second determining.

An embodiment may be directed to a method. The method can include activating, at a receiving user equipment, hybrid automatic repeat request feedback for a message received from a transmitting user equipment. The method can also include determining whether to provide hybrid automatic repeat request feedback regarding the message conditioned on at least one condition in addition to whether the message was successfully decoded. The method can further include providing or suppressing hybrid automatic repeat request feedback to the transmitting user equipment based on a result of the determining.

An embodiment can be directed to an apparatus. The apparatus can include means for enabling, for a receiving user equipment, hybrid automatic repeat request feedback for a message transmission to the receiving user equipment. The apparatus can also include means for first determining whether hybrid automatic repeat request feedback is conditioned on at least one first condition. The apparatus can further include means for second determining whether to retransmit the message according to hybrid automatic repeat request according to a result of the first determining. The apparatus can additionally include means for communicating with the receiving user equipment based on a result of the second determining.

An embodiment can be directed to an apparatus. The apparatus can include means for activating, at a receiving user equipment, hybrid automatic repeat request feedback for a message received from a transmitting user equipment. The apparatus can also include means for determining whether to provide hybrid automatic repeat request feedback regarding the message conditioned on at least one condition in addition to whether the message was successfully decoded. The apparatus can further include means for providing or suppressing hybrid automatic repeat request feedback to the transmitting user equipment based on a result of the determining.

BRIEF DESCRIPTION OF THE DRAWINGS

For proper understanding of example embodiments, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for providing user equipment behavior with respect to hybrid automatic repeat request retransmission in new radio sidelink co-existence scenarios with another technology, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Certain embodiments may have various aspects and features. These aspects and features may be applied alone or in any desired combination with one another. Other features, procedures, and elements may also be applied in combination with some or all of the aspects and features disclosed herein.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

Certain embodiments relate to third generation partnership project (3GPP) release 18 (Rel-18), and more particular to new radio (NR) sidelink (SL). For example, certain embodiments relate to co-existence amongst long term evolution (LTE) and NR as to vehicle to everything (V2X). LTE V2X and NR V2X may co-exist in the same frequency channel. When the two different types of devices coexist while using a common carrier frequency, it may be valuable to have an efficient mechanism to handle resource allocation by the two technologies without negatively impacting the operation of each technology.

It may be valuable to go beyond supporting in-device coexistence and also support co-channel coexistence, namely the coexistence between different devices (UEs) in the same radio resources/carrier frequency.

Figure 1A:
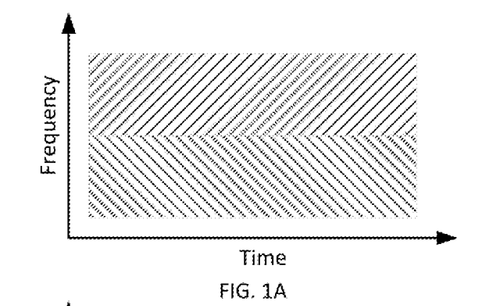
FIG. 1A illustrates an example of co-channel co-existence in a same carrier using frequency division multiplexing.
Figure 1B:
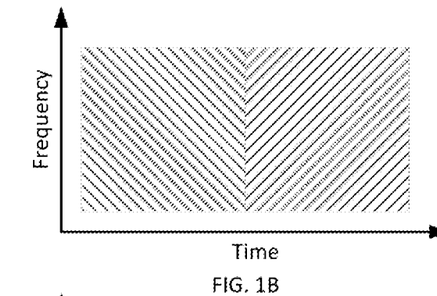
FIG. 1B illustrates an example of co-channel co-existence in a same carrier using time division multiplexing.
Figure 1C:
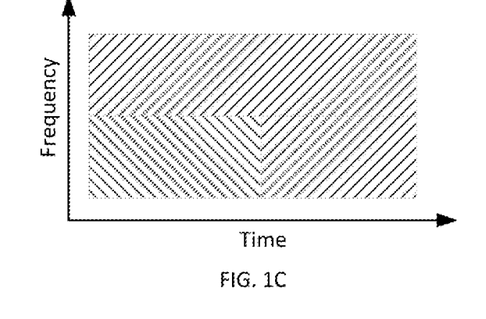
FIG. 1C illustrates an example of co-channel co-existence in a same carrier using a mix of time division multiplexing and frequency division multiplexing.
Figure 1D:
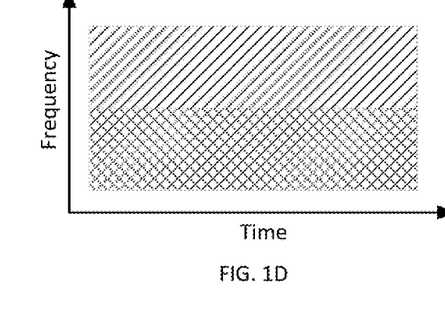
FIG. 1D illustrates an example of co-channel co-existence in a same carrier using overlaid new radio in long term evolution with dedicated new radio resources.
Figure 1E:
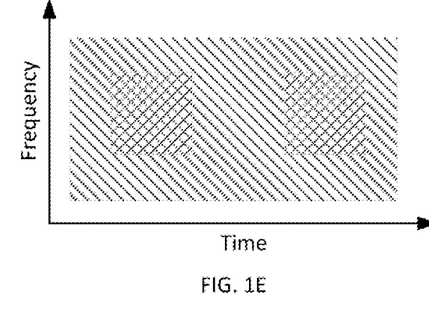
FIG. 1E illustrates an example of co-channel co-existence in a same carrier using overlaid new radio in long term evolution without dedicated new radio resources.

In FIGS. 1A to 1E, some examples of coexistence of LTE-V2X and NR-V2X in the same radio resources are illustrated. FIG. 1A shows frequency division multiplexing (FDM) of LTE-V2X and NR-V2X. FIG. 1B shows time division multiplexing (TDM) of LTE-V2X and NR-V2X. FIG. 1C illustrates a mixture of FDM and TDM of LTE-V2X and NR-V2X. FIG. 1D shows overlaid NR in LTE, with dedicated NR resources, while FIG. 1E illustrates overlaid NR in LTE, without dedicated NR resources. In the approach of FIG. 1E, NR-V2X may access the resources opportunistically.

From a resource use point of view, dynamic spectrum sharing, as in the examples depicted in FIGS. 1D and 1E, may be more flexible and enables higher efficiency. However, these schemes may be more complex due to the ancillary mechanisms that enable their coexistence with other systems. In contrast to FIGS. 1D and 1E, static spectrum sharing options, as those depicted in FIGS. 1A, 1B, and 1C, are simpler.

FIG. 1E may be the only available option in practice, as the LTE-V2X devices may be configured to occupy the entire bandwidth and NR-V2X devices may need to be able to adapt to such occupation in order to be able to access the intelligent transport system (ITS) band. Considering potential difficulties to modify pre-configuration, it may be better to allow NR V2X UE use all the available resources, so that there are no dedicated resources for LTE or NR but the same resources are available for both, namely complete overlap.

References to type A devices can refer to devices that have both a NR SL module and a long term evolution (LTE) SL module. References to type B devices can refer to devices that have only NR SL module. These labels A and B are for ease of reference only, and not by way of priority, order, or preference.

For device type A, the NR SL module may use the sensing and resource reservation information shared by the LTE SL module. Thus, co-channel coexistence between LTE SL and NR SL may be supported for device type A. The NR SL resource pool may be configured with 15 kHz sub-carrier spacing (SCS). If physical sidelink feedback channel (PSFCH) is configured, there may be various options. In certain cases, PSFCH transmission may be avoided in time slots that overlap with subframes used for LTE SL transmission. In another case, SL UEs may use periodically repeating set of PSFCH slots.

Figure 2A:
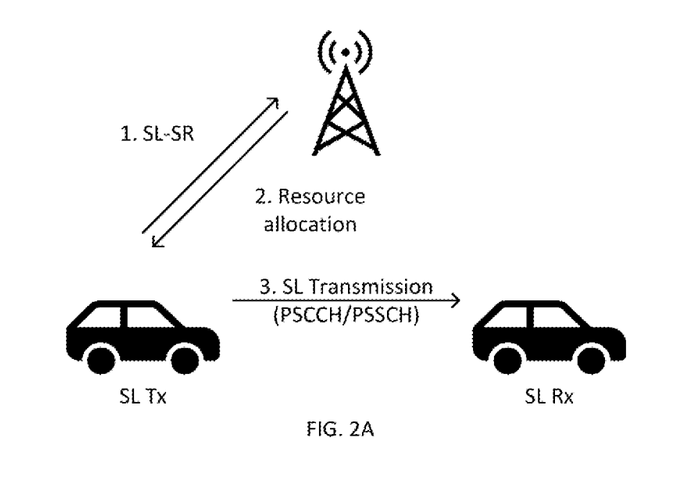
FIG. 2A illustrates mode 3 long term evolution sidelink resource allocation.
Figure 2B:
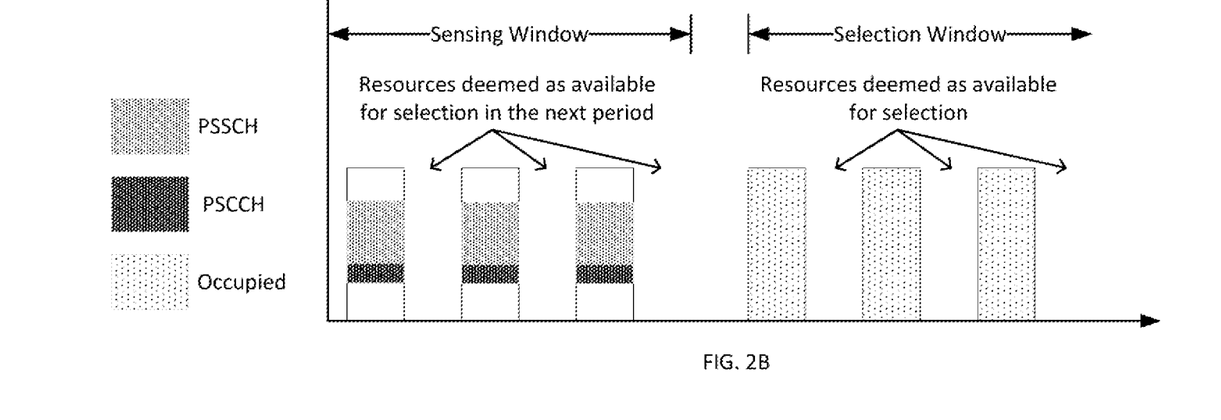
FIG. 2B illustrates mode 4 long term evolution sidelink resource allocation.

FIGS. 2A and 2B respectively illustrate mode 3 and mode 4 long term evolution sidelink resource allocation. For third generation partnership project (3GPP) release 14 (Rel-14) and release 15 (Rel-15), LTE-V2X has been designed to facilitate vehicles to communicate with other nearby vehicles via direct/SL communication. Communications between these vehicles can take place in LTE-V2X using either mode 3 or mode 4, which are respectively shown in FIGS. 2A and 2B.

As shown in FIG. 2A, when a device is in mode 3, the sidelink radio resources may be scheduled by the base station or evolved NodeB (eNB). Thus, this approach may only be available when vehicles are under cellular coverage.

When a device is in mode 4 as shown in FIG. 2B, the vehicles may autonomously select their own sidelink radio resources regardless of whether the vehicles are under cellular coverage. When the vehicles are under cellular coverage, the network may decide how to configure the LTE-V2X channel and may inform the vehicles through cellular network configurable parameters. The message can include the carrier frequency of the LTE-V2X channel, the LTE-V2X resource pool, synchronization references, the channelization scheme, the number of subchannels per subframe, and the number of RBs per subchannel, among other things.

When the vehicles are not under cellular coverage, the vehicles can utilize a preconfigured set of parameters to replace the cellular network configurable parameters.

The LTE-V2X resource pool may indicate which subframes of a channel are to be utilized for LTE-V2X. The rest of the subframes can be utilized by other services, including cellular communications.

The autonomous resource selection in mode 4 can be performed using a sensing and resource exclusion procedure, for example as specified in Rel-14, in which a vehicle can reserve one or more selected subchannels for a number of periodically recurring packet transmissions. This reservation can, in turn, be sensed by other vehicles, which may affect the resource selection/exclusion decisions of the other vehicles.

In LTE SL for V2X, the following SL control information (SCI) can be included in SCI format 1 for scheduling physical sidelink shared channel (PSSCH) transmission as well as mode 4 resource sensing: priority, 3 bits; resource reservation, 4 bits; frequency resource location of initial transmission and retransmission, variable bits; time gap between initial transmission and retransmission, 4 bits; modulation and coding scheme, 5 bits; retransmission index, 1 bit; transmission format, 1 bit; and reserved information bits added until the size of SCI format 1 is equal to 32 bits.

In 3GPP Rel-16, NR SL may facilitate a user equipment (UE) to communicate with other nearby UE(s) via direct/SL communication. Two resource allocation modes, denoted as NR SL mode 1 and NR SL mode 2, can be supported for NR SL similarly to LTE SL mode 3 and mode 4, respectively. In mode 1, a sidelink transmission resource can be assigned or scheduled by the network (NW) to the SL TX UE, while a SL TX UE in mode 2 can autonomously select the UE's SL transmission resources.

In NR SL, SCI can follow a 2-stage SCI structure as follows. The first stage SCI, SCI format 1-A, can be carried by physical sidelink control channel (PSCCH) and can contain information to enable sensing operations as well as information needed to determine resource allocation of the PSSCH and to decode 2nd-stage SCI. As an example of the contents of the first stage SCI, refer to 3GPP technical specification (TS) 38.212, section 8.3.1.1, and table 8.3.1.1-1, which illustrates how two bits can be used to indicate second stage SCI format. In that example, there are two possible second stage SCI formats, respectively format 2-A and format 2B.

The second stage SCI, SCI format 2-A and 2-B, can be carried by PSSCH multiplexed with sidelink shared channel (SL-SCH) and can contain source and destination identities, information to identify and decode the associated SL-SCH transport block (TB), information to control of hybrid automatic repeat request (HARQ) feedback in unicast/groupcast, and information to trigger for channel state information (CSI) feedback in unicast. 3GPP standards provide for specific contents of the second stage SCI, and those contents may differ between SCI format 2-A and SCI format 2A.

Figure 3:
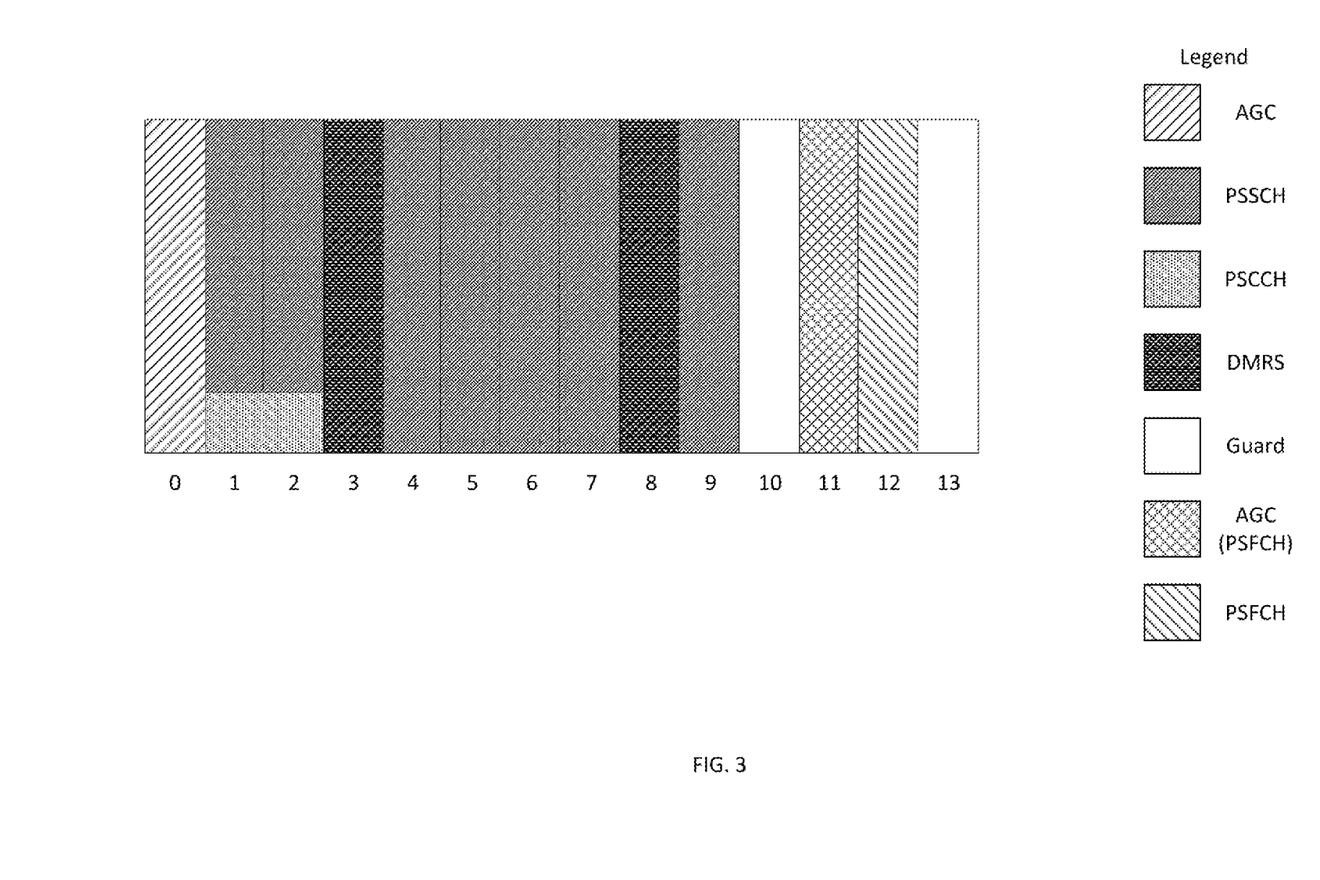
FIG. 3 illustrates a sidelink slot with physical sidelink control channel, physical sidelink shared channel, and physical sidelink feedback channel.

FIG. 3 illustrates a sidelink slot with physical sidelink control channel, physical sidelink shared channel, and physical sidelink feedback channel. The PSFCH was introduced in Rel-16 to enable HARQ feedback over the sidelink from a UE that is the intended recipient of a PSSCH transmission, also referred to as the receive (RX) UE, to the UE that performed the transmission, also referred to as the transmit (TX) UE. Within a PSFCH, a Zadoff-Chu sequence in one PRB can be repeated over two OFDM symbols, the first of which can be used for automatic gain control (AGC), near the end of the sidelink resource in a slot. An example slot format of PSCCH, PSSCH, and PSFCH is provided in FIG. 3. The Zadoff-Chu sequence as base sequence can be (pre-)configured per sidelink resource pool.

The time resources for PSFCH can be (pre-)configured to occur once every 1, 2, or 4 slots. The HARQ feedback resource, PSFCH, can be derived from the resource location of PSCCH/PSSCH. In NR SL, there can be support for all the cast types: broadcast, groupcast, and unicast. For SL groupcast, the following two HARQ feedback options were specified. In SL groupcast HARQ option 1, also known as "negative-only acknowledgement" in 3GPP TS 38.321, a SL Rx UE within a range of the SL Tx UE can send only a negative-acknowledgement (NACK) feedback if the SL Rx UE successfully decodes the SCI but fails in decoding the data payload. In this option, the intended SL Rx UEs can send NACK feedback over common PSFCH resources that are mapped from resources of PSSCH.

In SL groupcast HARQ option 2, also known as "negative-positive acknowledgement" in 3GPP TS 38.321, a SL Rx UE can send either acknowledgement (ACK), NACK, or nothing. ACK can be sent if the SL Rx UE has received successfully the PSCCH and PSSCH. NACK can be sent if the SL Rx UE has successfully decoded the SCI but has failed in decoding the data payload. The nothing response or discontinuous transmission (DTX) can be the outcome if the SL Rx US does not decode the SCI. In SL groupcast HARQ option 2, an intended SL Rx UE can send feedback over a dedicated PSFCH resource, such as UE-specific PSFCH resource.

Dynamic resource sharing for NR SL and LTE SL co-channel co-existence may be beneficial. When PSFCH is configured, one of the alternatives may be to avoid PSFCH transmission in time slots that overlap with subframes used for LTE SL transmissions, as mentioned above. For NR SL HARQ feedback with ACK or NACK, avoiding PSFCH transmission may cause unnecessary HARQ retransmission if ACK is avoided/skipped. Though the unnecessary HARQ retransmissions may use more resources, the approach may prevent reliability issues due to lack of HARQ ACK or NACK feedback.

For NR SL groupcast HARQ feedback option 1, also known as the NACK-only feedback option, certain issues may arise. For example, HARQ NACK feedback over PSFCH from NR SL receiving (Rx) UE may not be made when NR SL groupcast Rx UE detects PSFCH resources overlap with LTE SL transmissions or when HARQ NACK feedback over PSFCH is interfered by LTE SL transmissions closer to NR SL Tx UE even if NR SL Rx UE does not skip HARQ NACK feedback transmission over PSFCH. In such a case, NR SL Tx UE may not trigger any HARQ retransmission as no HARQ NACK is received if the existing NR SL Tx UE behavior is performed. Thus, reliability of the NR SL groupcast communication may not be guaranteed for those group members that did not receive previous PSSCH transmission correctly and could not send HARQ NACK feedback due to PSFCH resource overlapping with LTE SL transmissions.

A UE not being able to transmit the HARQ NACK feedback may also be present in the case of operation in unlicensed shared spectrum. For example, the transmission of another device, either SL or other system, can trigger the Rx UE to fail to acquire access to the channel. For example, the listen before talking (LBT) check may not be passed successfully. Thus, the Rx UE may not be able to transmit HARQ feedback if LBT check has not been passed successfully.

Certain embodiments may resolve or avoid the above-identified issues and may make NR SL groupcast more reliable in the NR SL and LTE SL co-existence scenario with dynamic resource sharing as well as in a more general case of unlicensed spectrum coexistence.

Certain embodiments may be based on the principle that an NR SL Tx UE, upon enabling HARQ feedback to be NACK-only feedback, can determine HARQ retransmission based not only on whether HARQ NACK is received from NR SL Rx UEs but also on a further condition. The further condition can include whether LTE SL transmissions are detected or not on a slot that HARQ NACK over PSFCH should be transmitted. The detection can be performed at the transmitting UE side or at both the transmitting UE side and the receiving UE side.

An NR SL Tx UE may be configured with a certain condition or set of conditions to determine whether HARQ feedback over PSFCH from NR SL Rx UE should be avoided/skipped if LTE SL transmissions are detected by NR SL Rx UE. The conditions can includes priority threshold, PQI value ranges, reliability threshold, or the like. If conditions are present, the transmitting UE can inform the receiving UE or the transmitting UE can simply be aware that the receiving UE will be skipping sending HARQ NACK even though negative-only HARQ is configured.

For example, if the NR SL Tx UE determines HARQ feedback over PSFCH should be avoided, the NR SL Tx UE can indicate the decision in SCI, such as 2nd stage of SCI, to the NR SL Rx UE. The indication can be either 1-bit indication to only indicate HARQ feedback over PSFCH should be avoided upon detection by the receiving UE of LTE SL transmissions on the overlapping resource. Alternatively, the indication may include more information on the condition of avoiding HARQ feedback over PSFCH. For instance, the condition may be the priority or reliability threshold of detected LTE SL transmission.

The NR SL groupcast Tx UE, upon enabling HARQ feedback and determining HARQ feedback over PSFCH can be avoided if LTE SL transmission is detected, can monitor LTE SL transmissions in the slot where HARQ feedback over PSFCH is expected. If LTE SL transmissions are detected, the NR SL Tx UE may determine to retransmit the HARQ transmission even without receiving NACK from NR SL Rx UE. As mentioned above.

The trigger of HARQ retransmission based on detection of LTE SL transmissions may be condition dependent. The trigger of HARQ retransmission may be based on the priority or reliability information of the detected LTE SL transmissions. If the corresponding condition of avoiding HARQ feedback over PSFCH is indicated/configured to NR SL Rx UE, the transmitting user equipment may take this configuration of the receiving user equipment into account. For instance, the transmitting UE may indicate to the receiving UE that negative HARQ feedback over PSFCH can be avoided only when the receiving UE has detected LTE SL transmission that has priority higher than the indicated priority threshold. In such a case, the transmitting UE may use the same priority threshold to determine whether HARQ retransmission should be triggered or not based on the priority value associated with the detected LTE SL transmissions.

The NR SL Tx UE can indicate to the Rx UE the priority threshold of the detected LTE SL transmission. When the Rx UE detects that there are LTE SL transmissions with priority higher than the threshold, the receiving UE can avoid sending HARQ feedback over PSFCH. Meanwhile, at the NR SL Tx UE side, the same priority threshold can be used to detect LTE SL transmission. In this way, the transmitting UE may nevertheless trigger HARQ retransmission when no HARQ feedback is received but the priority of detected LTE SL transmission is higher than the same threshold. Thus, both the transmitting UE and the receiving UE can detect LTE SL transmission according to the same priority threshold. The priority threshold can be standardized or can be configured to the receiving UE by the transmitting UE or can be configured to the receiving UE and transmitting UE by the network or via pre-configuration.

Certain embodiments are described from the perspective of NR SL and LTE SL co-existence scenarios with dynamic resource sharing. The same principles can be applied for NR SL in unlicensed band co-existing with other unlicensed band users or radio access technologies. More detailed implementation examples are provided below with reference to FIGS. 4 and 5, which are non-limiting examples.

Figure 4:
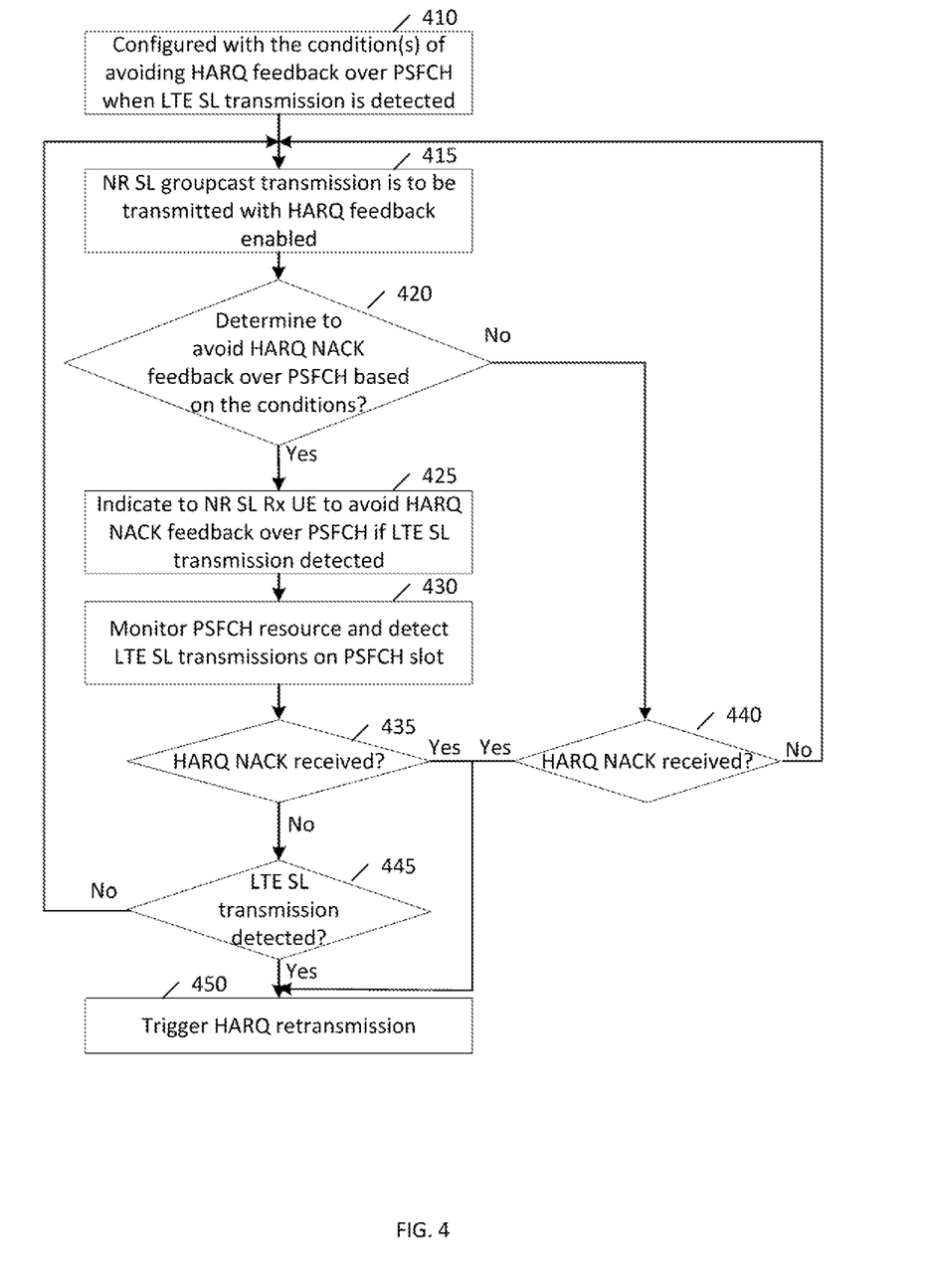
FIG. 4 illustrates an example of new radio sidelink transmitting user equipment implementation, according to certain embodiments.

FIG. 4 illustrates an example of new radio sidelink transmitting user equipment implementation, according to certain embodiments.

At 410, the NR SL Tx UE may be configured with one or more conditions for determining whether HARQ feedback over PSFCH should be avoided or not if LTE SL transmission is detected on the shared resources in NR SL and LTE SL co-existence scenario. The conditions may be either configured from the network (NW) or pre-configured to the NR SL Tx UE. The configured conditions may include, for example, the priority, PQI, or the reliability target of NR SL communication that the Tx UE is to transmit. The condition may also include the size of SL group and/or range of SL groupcast communication.

At 415, it may be determined that an NR SL groupcast transmission is to be transmitted with HARQ feedback enabled, such as with HARQ negative only feedback enabled.

When NR SL Tx UE has SL data to be transmitted, the NR SL Tx UE, based on the configured conditions, at 420 can determine whether HARQ feedback over PSFCH should be avoided by NR SL Rx UE when LTE SL transmissions are detected by the NR SL Rx UE on the same resources for HARQ feedback transmission. If HARQ feedback does not need to be avoided, then at 440, the transmitting UE can determine whether a HARQ NACK was received. If not, then the UE can return to await a next transmission; in particular, no HARQ retransmission may be triggered by the NR SL Tx UE. Thus, if the determination outcome at 420 is no and consequently HARQ feedback over PSFCH transmission is to be transmitted regardless of whether LTE SL transmissions are detected, then the usual Tx UE's behavior on monitoring HARQ feedback and triggering HARQ retransmission can be performed.

On the other hand, if the determination outcome at 420 is yes, and consequently HARQ feedback over PSFCH transmission is to be avoided when LTE SL transmissions are detected, further Tx UE behavior as described below can be performed, starting at 425.

In case NR SL Tx UE determines to avoid HARQ feedback over PSFCH, at 425 the Tx UE may indicate this to NR SL Rx UE. This indication can be a one-bit indication to inform Rx UE to skip or avoid HARQ feedback over PSFCH if LTE SL transmissions are detected by the receiving UE. The indication can also include the conditions on the detected LTE SL transmissions for the receiving UE to determine whether HARQ feedback over PSFCH should be avoided or not. For instance, the conditions may include the priority, indicated in the SCI of LTE SL transmissions, of LTE SL transmissions, the detected power strength of LTE SL transmissions, or the like. For example, the priority threshold may be included as one of the conditions, which can be used by NR SL Rx UE to determine to avoid/skip HARQ feedback over PSFCH only if the priority of the detected LTE SL transmissions are higher than the threshold. Additionally and instead of priority, the power strength threshold may be one of the conditions, which can be used by NR SL Rx UE to determine to avoid/skip HARQ feedback over PSFCH only if the received power strength of detected LTE SL transmissions are higher than the threshold. As another option, the conditions on the detected LTE SL transmissions to determine whether HARQ feedback over PSFCH should be avoided or not may be configured to Rx UE from NW or pre-configured instead of indicated by the Tx UE.

Upon determining to avoid HARQ feedback over PSFCH and optionally indicating this to NR SL Rx UE in the NR SL transmission, the NR SL Tx UE may, at 430, monitor the expected PSFCH resources for HARQ feedback and may detect LTE SL transmissions on the LTE subframes having overlapping resources with PSFCH resources. If HARQ NACK feedback is received at 435 or HARQ NACK feedback is not received but LTE SL transmissions are detected at 445, then the NR SL Tx UE can trigger HARQ retransmission at 450. If no HARQ NACK is received at 435 and no LTE SL transmission is detected at 445, the UE can proceed to perform next transmission without HARQ retransmission being triggered.

Thus, there can be at least two cases to trigger HRQ retransmission. If HARQ NACK feedback is received, regardless of whether LTE SL transmissions are detected or not at the Tx UE side, then HARQ retransmission can be triggered. In certain cases, LTE SL transmissions may be detected only at the transmitting UE or at a higher level at the transmitting UE. Thus, the LTE transmission may interfere the reception of HARQ NACK feedback in the transmitting UE. Then the NR SL Tx UE may also trigger HARQ retransmission as a HARQ NACK is received.

When HARQ NACK feedback is not received and LTE SL transmissions are detected, the transmitting UE can assume that the receiving UE also detected the LTE SL transmissions and suppressed HARQ NACK. Thus, to ensure reliable reception, the transmitting UE may perform HARQ retransmission.

If HARQ NACK is not received and LTE SL transmissions are not detected, the NR SL Tx UE can make new transmission for upcoming SL data.

Detection of LTE SL transmission by NR SL Tx and Rx UE may be based on LTE SL sensing. Such sensing may involve monitoring LTE SCI to identify whether there is LTE SL transmission happening in overlapping resources with NR PSFCH resources for HARQ feedback. When such transmission is detected, the conditions on, for example, priorities can be applied for Rx UE and Tx UE to determine whether HARQ feedback over PSFCH is to be avoided or not. This approach can be applied for UE device type A, as such a device may have both NR SL module and LTE SL module.

Detection of LTE SL transmission by NR SL Tx and Rx UE may be based on energy detection. For instance, a 3 decibel (db) power spectral density (PSD) difference between LTE PSCCH and PSSCH can be used to detect the existence of LTE SL transmissions. For another instance, the energy detection in the guard symbol before PSFCH symbol, as illustrated in FIG. 3, can be used for energy detection. If there is energy detected, the UE can interpret this detection as meaning that LTE SL transmissions are detected. This detection method is especially useful in NR SL Rx UE and Tx UE perspective in order to determine whether HARQ feedback over PSFCH should be avoided or not. In this case, the power based condition may be applied for Rx UE and Tx UE to determine whether HARQ feedback over PSFCH is avoided or not. This approach can be applied for either UE device type A or UE device type B, since such an approach may be implementable with only an NR SL module.

Detection of LTE SL transmissions by NR SL Tx and Rx UE may be based on NR SL sensing. For instance, if NR SL UE sensed the NR SL transmissions across the whole frequency domain in the slot that HARQ feedback via PSFCH is expected, the NR SL UE can assume that no LTE SL transmission detected. This approach can be applied for either UE device type A or UE device type B.

In addition, detection of LTE SL transmissions can also take into account relative positions of NR SL Tx UE, NR SL Rx UEs, and LTE SL Tx/Rx UEs to determine the received power strength or likelihood, for example in term of probability, as the criteria for detection of LTE SL transmissions. Other conditions are also permitted, with these serving as examples.

Different conditions may be used for enabling HARQ feedback, without consideration of conflict with LTE SL transmission, and for avoiding HARQ feedback if conflict with LTE SL transmissions. The conditions for enabling HARQ feedback may, for example, include enabling HARQ feedback for resource efficiency for all the NR SL services that require certain reliability. HARQ feedback avoidance may only be configured for NR SL services that do not have very high priority but still have a high reliability requirement. The same conditions can be applied for both, such that HARQ feedback avoidance may be configured for all HARQ feedback enabled transmissions. HARQ feedback avoidance may be performed contingent on detection of LTE SL transmissions. That is, even with HARQ feedback avoidance configured, HARQ feedback may still be provided because the condition(s) are not met in a particular instance.

When the co-existing/overlapping transmission is detected between LTE SL transmissions and HARQ feedback transmissions, the resource used for NR SL transmissions from NR SL Tx UE to Rx UE may not overlap with the resource used for LTE SL transmissions. Instead, in certain embodiments, the NR SL Rx UE may provide NACK correctly to NR SL Tx UE if the transmissions from the NR SL Tx UE to the NR SL Rx UE are interfered by LTE SL, but HARQ NACK feedback over PSFCH may not conflict with LTE SL transmissions. On the other hand, NACK may be avoided due to detection of LTE SL transmissions overlapping with the feedback channel resources. In this case, without certain embodiments, the NACK might be interfered by the LTE SL transmissions and the Tx UE would not trigger retransmission as the Tx UE would assume the Rx UE receives NR SL transmission correctly, as NACK is not received. Such a failure of triggering the retransmission may cause a reliability issue of NR SL transmission. Certain embodiments ensure the reliability of NR SL transmissions even when HARQ NACK is not transmitted by NR SL Rx UE due to detection of LTE SL transmissions.

Figure 5:
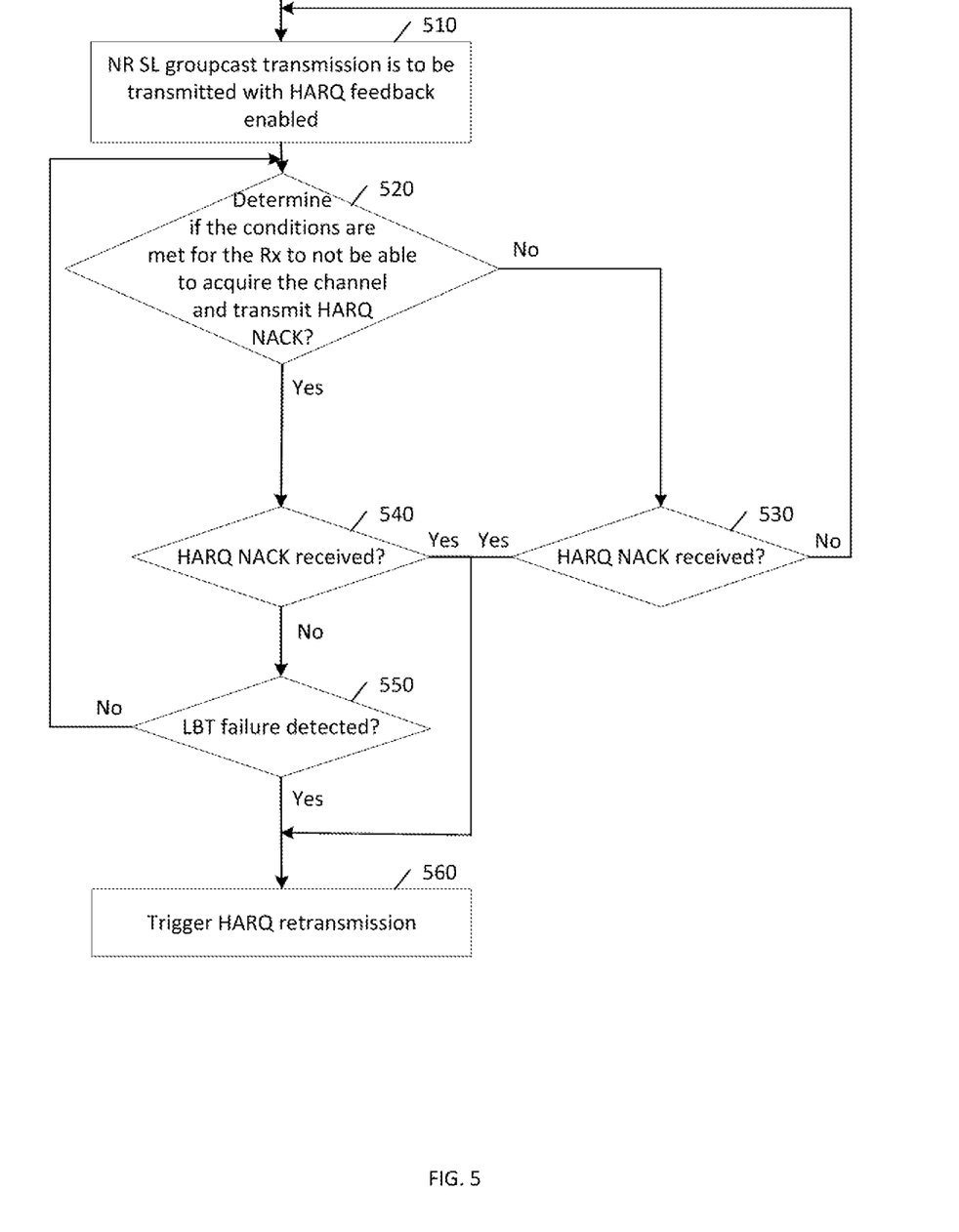
FIG. 5 illustrates an example of a new radio sidelink transmitting user equipment implementation in an unlicensed spectrum co-existence situation, according to certain embodiments.

FIG. 5 illustrates an example of a new radio sidelink transmitting user equipment implementation in an unlicensed spectrum co-existence situation, according to certain embodiments.

When operating in unlicensed spectrum the reason to be unable to perform HARQ NACK feedback transmission is related to the Rx being unable to successfully complete the LBT procedure prior to the PSFCH resource. In contrast with the NR SL and LTE SL co-existence scenario, the UE upon failing to complete the LBT procedure will not be allowed to proceed with PSFCH transmission. Therefore, in the unlicensed spectrum coexistence scenario when the Tx UE requests HARQ feedback then it has to be able to detect the case when there is no HARQ NACK feedback received that it can be due to LBT failure at the Rx UE.

As shown in FIG. 5, at 510, there may be NR SL groupcast transmission to be transmitted with HARQ feedback enabled. As explained above, this HARQ feedback enablement may be configured based on a reliability or any other trigger for enabling HARQ feedback. For example, HARQ NACK-only feedback may be enabled.

At 520, the transmitting UE may determine if conditions are met for the Rx UE to not be able to acquire the channel and transmit the HARQ NACK. If those conditions are not met, then at 530, the transmitting UE may simply try to detect a HARQ NACK and trigger HARQ retransmission at 560 when a NACK is received. Otherwise, the transmitting UE may proceed to a next transmission without triggering HARQ retransmission. The conditions can be any conditions that prevent acquisition of a channel where negative feedback may be expected, for example, over PSFCH.

The conditions can include, for example, that the level of activity in the resource pool resources is above a channel busy ratio (CBR) threshold, which may provide a measure the likelihood of other SL transmissions inducing listen before talk (LBT) failure. Another example of a condition may be a rate of LBT failure in the resource block (RB) set(s) where the resource pool is deployed being above a threshold. Yet another example of a condition may be a number of clear channel access slots where the LBT failed, within an observation window preceding the PSFCH resource, being above a threshold.

Additionally, if the Tx UE can determine the Tx UE's proximity to the Rx UE(s) in the group, for example based on SL positioning, or other methods, then based on that proximity information the Tx UE can determine the likelihood that if LBT fails at the Tx UE then LBT will also fail at the Rx UE.

As in the previous example of FIG. 4, in the method of FIG. 5, the transmitting UE may still look for a HARQ NACK at 540 and may proceed to 560 when such a HARQ NACK is detected. However, if no HARQ NACK is received at 540, then at 550, the transmitting UE may determine whether LBT failure or conditions for LBT failure are predicted, expected, or otherwise detected. In case the Tx UE detects the occurrence of LBT failure, for example by performing LBT in the slots preceding the PSFCH resource, and the Tx UE has ascertained at 520 that the conditions to perform Tx UE-centric LBT failure detection at the Rx UE have been met, then whenever the Tx detects a LBT failure at 550 then the transmitting UE can assume that the receiving UE has also experienced a LBT failure and can therefore trigger a HARQ retransmission at 560. Otherwise the transmitting UE can await a next transmission.

Figure 6:
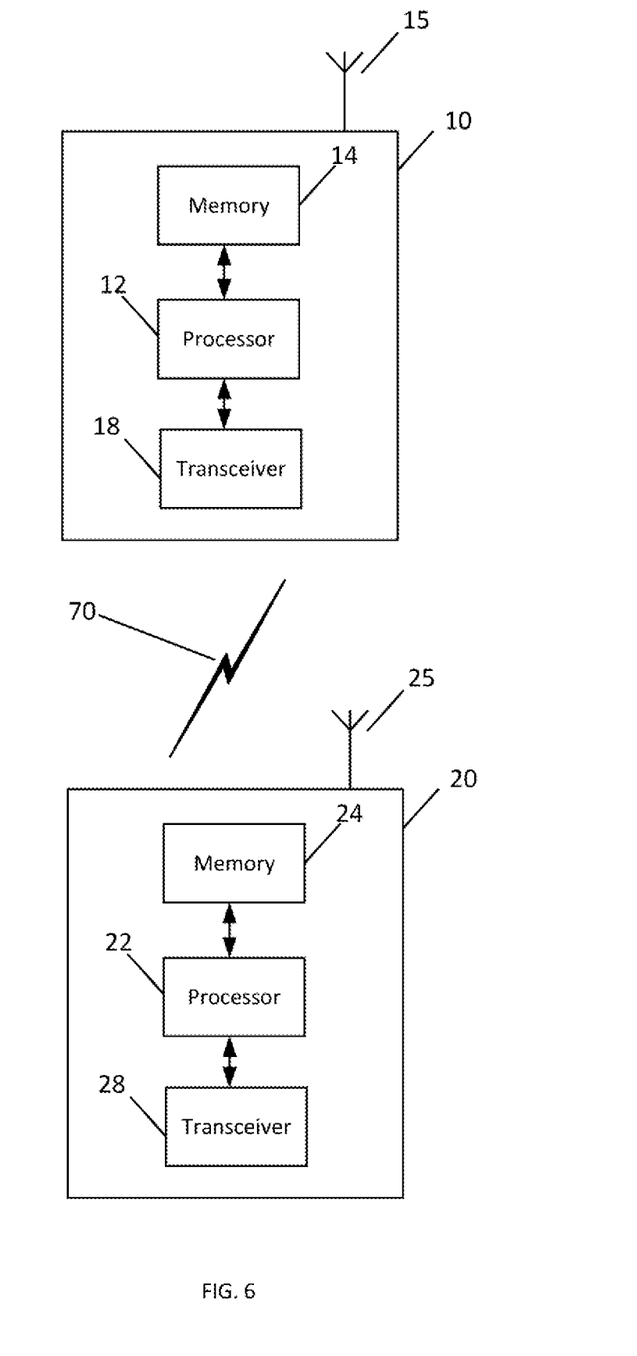
FIG. 6 illustrates an example block diagram of a system, according to an embodiment.

FIG. 6 illustrates an example of a system that includes an apparatus 10, according to an embodiment. In an embodiment, apparatus 10 may be a node, host, or server in a communications network or serving such a network. For example, apparatus 10 may be a network node, satellite, base station, a Node B, an evolved Node B (eNB), 5G Node B or access point, next generation Node B (NG-NB or gNB), TRP, HAPS, integrated access and backhaul (IAB) node, and/or a WLAN access point, associated with a radio access network, such as a LTE network, 5G or NR. In some example embodiments, apparatus 10 may be gNB or other similar radio node, for instance.

It should be understood that, in some example embodiments, apparatus 10 may include an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a mid-haul interface, referred to as an F1 interface, and the DU(s) may have one or more radio unit (RU) connected with the DU(s) over a front-haul interface. The DU may be a logical node that includes a subset of the gNB functions, depending on the functional split option. It should be noted that one of ordinary skill in the art would understand that apparatus 10 may include components or features not shown in FIG. 6.

As illustrated in the example of FIG. 6, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, or any other processing means, as examples. While a single processor 12 is shown in FIG. 6, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to user equipment behavior with respect to hybrid automatic repeat request retransmission in new radio sidelink co-existence scenarios with another technology.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be include any combination of random access memory (RAM), read only memory (ROM), static storage such as a magnetic or optical disk, hard disk drive (HDD), or any other type of non-transitory machine or computer readable media, or other appropriate storing means. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15, or may include any other appropriate transceiving means. The radio interfaces may correspond to a plurality of radio access technologies including one or more of global system for mobile communications (GSM), narrow band Internet of Things (NB-IoT), LTE, 5G, WLAN, Bluetooth (BT), Bluetooth Low Energy (BT-LE), near-field communication (NFC), radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (via an uplink, for example).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device), or an input/output means.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry/means or control circuitry/means. In addition, in some embodiments, transceiver 18 may be included in or may form a part of transceiver circuitry/means.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be or may be a part of a network element or RAN node, such as a base station, access point, Node B, eNB, gNB, TRP, HAPS, IAB node, relay node, WLAN access point, satellite, or the like. In one example embodiment, apparatus 10 may be a gNB or other radio node, or may be a CU and/or DU of a gNB. According to certain embodiments, apparatus 10 may be controlled by memory 14 and processor 12 to perform the functions associated with any of the embodiments described herein. For example, in some embodiments, apparatus 10 may be configured to perform one or more of the processes depicted in any of the flow charts or signaling diagrams described herein, such as those illustrated in FIG. 1A-5, or any other method described herein. In some embodiments, as discussed herein, apparatus 10 may be configured to perform a procedure relating to providing user equipment behavior with respect to hybrid automatic repeat request retransmission in new radio sidelink co-existence scenarios with another technology, for example.

FIG. 6 further illustrates an example of an apparatus 20, according to an embodiment. In an embodiment, apparatus 20 may be a node or element in a communications network or associated with such a network, such as a UE, communication node, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 6.

As illustrated in the example of FIG. 6, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 6, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can include any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDM symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, SL UE, relay UE, mobile device, mobile station, ME, IoT device and/or NB-IoT device, or the like, for example. According to certain embodiments, apparatus 20 may be controlled by memory 24 and processor 22 to perform the functions associated with any of the embodiments described herein, such as one or more of the operations illustrated in, or described with respect to, FIG. 1A-5, or any other method described herein. For example, in an embodiment, apparatus 20 may be controlled to perform a process relating to providing user equipment behavior with respect to hybrid automatic repeat request retransmission in new radio sidelink co-existence scenarios with another technology, as described in detail elsewhere herein.

In some embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of any of the operations discussed herein.

In view of the foregoing, certain example embodiments provide several technological improvements, enhancements, and/or advantages over existing technological processes and constitute an improvement at least to the technological field of wireless network control and/or management. Certain embodiments may provide various benefits and/or advantages. For example, certain embodiments may make NR SL groupcast more reliable in the NR SL and LTE SL co-existence scenario with dynamic resource sharing as well as in a more general case of unlicensed spectrum coexistence. Certain embodiments ensure the reliability of NR SL transmissions even when HARQ NACK is not transmitted by NR SL Rx UE due to detection of LTE SL transmissions.

In some example embodiments, the functionality of any of the methods, processes, signaling diagrams, algorithms or flow charts described herein may be implemented by software and/or computer program code or portions of code stored in memory or other computer readable or tangible media, and may be executed by a processor.

In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks. A computer program product may include one or more computer-executable components which, when the program is run, are configured to carry out some example embodiments. The one or more computer-executable components may be at least one software code or portions of code. Modifications and configurations required for implementing the functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium. The term "non-transitory" as used herein, is a limitation of the medium itself (i.e. tangible, not a signal) as opposed to a limitation on data storage persistency (e.g. RAM vs. ROM).

In other example embodiments, the functionality of example embodiments may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality of example embodiments may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein may apply to both singular and plural implementations, regardless of whether singular or plural language is used in connection with describing certain embodiments. For example, an embodiment that describes operations of a single network node may also apply to example embodiments that include multiple instances of the network node, and vice versa.

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

PARTIAL GLOSSARY

SCI Sidelink Control Information
SL Sidelink
TX Transmitter
RX Receiver
HARQ Hybrid Automatic Repeat Request
PDSCH Physical Downlink Shared Channel
PQI PDSCH remapping and Quasi-co-location Indicator
PSFCH Physical Sidelink Feedback Channel
PSSCH Physical Sidelink Shared Channel
V2X Vehicle-to-Everything

We claim:
1. An apparatus, comprising:
   at least one processor; and
   at least one memory storing instructions that, when executed by the at least one processor, cause the apparatus at least to perform
   enabling, for a receiving user equipment, hybrid automatic repeat request feedback for a new radio sidelink groupcast message transmission to the receiving user equipment;

first determining whether hybrid automatic repeat request feedback is conditioned on at least one first condition, the at least one condition comprising detection by the receiving user equipment of a listen before talk failure condition being present before at least one resource where hybrid automatic repeat request feedback is expected by the receiving user equipment;

second determining whether to retransmit the message according to hybrid automatic repeat request according to a result of the first determining; and communicating with the receiving user equipment based on a result of the second determining.

2. The apparatus of claim 1, wherein the instructions further cause the apparatus at least to perform third determining whether to condition hybrid automatic repeat request feedback on at least one second condition; and based on the third determining, configuring the receiving user equipment to provide hybrid automatic repeat request feedback according to the at least one first condition.

3. The apparatus of claim 2, wherein the configuring comprises indicating a result of the third determining in sidelink control information as a one-bit indication or as information on the at least one of priority level, reliability level and received power level on the at least one first condition.

4. The apparatus of claim 2, wherein the at least one second condition comprises detection by the apparatus of hybrid automatic repeat request feedback and the at least one first condition.

5. The apparatus of claim 1, wherein the at least one first condition comprises detection by the receiving user equipment of sidelink transmissions on at least one resources where hybrid automatic repeat request feedback is expected or detection of conditions preventing acquisition of a channel where the hybrid automatic repeat request feedback is expected.

6. The apparatus of claim 1, wherein the at least one first condition comprises detection by the receiving user equipment of sidelink transmissions having a priority exceeding a priority threshold or a power level exceeding a power level threshold.

7. The apparatus of claim 1, wherein the at least one first condition, the at least one second condition, or both the at least one first condition and the at least one second condition are configured to the apparatus by a network.

8. The apparatus of claim 1, wherein hybrid automatic repeat request feedback is hybrid automatic repeat request negative feedback.

9. An apparatus, comprising:
at least one processor; and
at least one memory storing instructions that, when executed by the at least one processor, cause the apparatus at least to perform
activating hybrid automatic repeat request feedback for a new radio sidelink groupcast message received from a transmitting user equipment;
determining whether to provide hybrid automatic repeat request feedback regarding the message conditioned on at least one condition in addition to whether the message was successfully decoded, the at least one condition comprising detection by the apparatus of a listen before talk failure condition being present before at least one resource where hybrid automatic repeat request feedback is expected by the apparatus; and
providing or suppressing hybrid automatic repeat request feedback to the transmitting user equipment based on a result of the determining.

10. The apparatus of claim 9, wherein the instructions further cause the apparatus at least to perform
receiving, from the transmitting user equipment, a configuration to provide hybrid automatic repeat request feedback according to the at least one condition.

11. The apparatus of claim 10, wherein the receiving the configuration comprises receiving a one-bit indication or as information on the at least one of priority level, reliability level and received power level on the at least one first condition.

12. The apparatus of claim 10, wherein the at least one condition comprises detection of sidelink transmissions by the apparatus.

13. The apparatus of claim 9, wherein the at least one condition comprises detection of sidelink transmissions having a priority exceeding a priority threshold configured by the transmitting user equipment or having a power level exceeding a power level threshold configured by the transmitting user equipment.

14. The apparatus of claim 9, wherein hybrid automatic repeat request feedback is hybrid automatic repeat request negative feedback.

15. A method, comprising:
enabling, for a receiving user equipment, hybrid automatic repeat request feedback for a new radio sidelink groupcast message transmission to the receiving user equipment;
first determining, by a transmitting user equipment, whether hybrid automatic repeat request feedback is conditioned on at least one first condition, the at least one condition comprising detection by the receiving user equipment of a listen before talk failure condition being present before at least one resource where hybrid automatic repeat request feedback is expected by the receiving user equipment;
second determining whether to retransmit the message according to hybrid automatic repeat request according to a result of the first determining; and
communicating with the receiving user equipment based on a result of the second determining.

16. The method of claim 15, further comprising:
third determining whether to condition hybrid automatic repeat request feedback on at least one second condition; and
based on the third determining, configuring the receiving user equipment to provide hybrid automatic repeat request feedback according to the at least one first condition.

17. The method of claim 16, wherein the configuring comprises indicating a result of the third determining in sidelink control information as a one-bit indication or as information on the at least one of priority level, reliability level and received power level on the at least one first condition.

18. The method of claim 16, wherein the at least one second condition comprises detection by the transmitting user equipment of hybrid automatic repeat request feedback and the at least one first condition.

19. The method of claim 15, wherein the at least one first condition comprises detection by the receiving user equipment of sidelink transmissions on at least one resources where hybrid automatic repeat request feedback is expected or detection of conditions preventing acquisition of a channel where the hybrid automatic repeat request feedback is expected.

\* \* \* \* \*